April 18, 1967  M. O. HOLOWATY ET AL  3,314,780
PROCESS OF PELLETIZING ORE
Filed July 7, 1964  4 Sheets-Sheet 3

Inventors
Michael O. Holowaty
Arthur M. Schwarz
By Hibben, Noyes & Bicknell
Attorneys

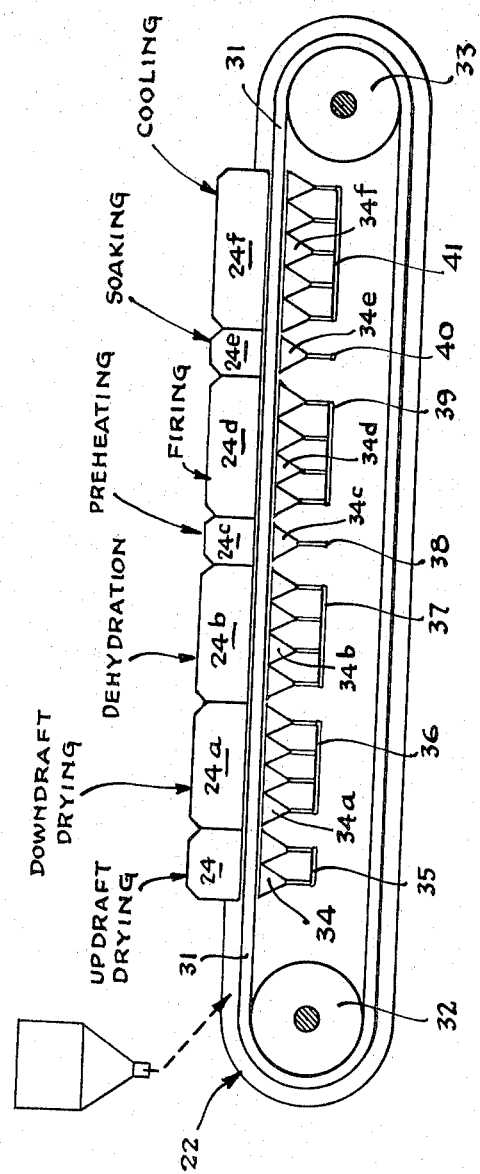

United States Patent Office 3,314,780
Patented Apr. 18, 1967

3,314,780
PROCESS OF PELLETIZING ORE
Michael O. Holowaty, Gary, and Arthur M. Schwarz, Munster, Ind., assignors to Inland Steel Company, Chicago, Ill., a corporation of Delaware
Filed July 7, 1964, Ser. No. 380,888
10 Claims. (Cl. 75—3)

The present invention relates generally to a method of forming heat hardened ore pellets and more particularly to a method of producing improved heat hardened iron ore pellets for use in the production of iron and steel from earthy iron ores which contain a high proportion of water of hydration.

Earthy iron ores which contain a high percentage of the iron in the form of goethite and brecciated ore which have in excess of about 5% by weight water of hydration are difficult to pelletize by means of conventional grinding, pelletizing, and induration procedures due to their unusually high percentage of water of hydration. In addition to the foregoing, many of these earthy iron ores contain an objectionable amount of impurities, such as arsenic, antimony, cadmium, sulphur, and slime forming ingredients which further interfere with the production of satisfactory iron ore pellets by conventional procedures.

It is therefore an object of the present invention to provide an improved process of preparing heat hardened pellets.

It is a further object of the present invention to provide an improved process of producing heat hardened pellets from iron ore containing a high percentage of brecciated ore and goethite.

It is still another object of the present invention to provide an improved process of preparing heat hardened pellets from an iron ore containing in excess of about 5% by weight water of hydration and more than about .01% by weight arsenic.

Other objects of the present invention will be apparent from the following detailed description and claims to follow when read in conjunction with the accompanying drawing, wherein:

FIG. 5 is a graph showing a typical heat induration cycle illustrating the heat hardening step.

Figure 1:
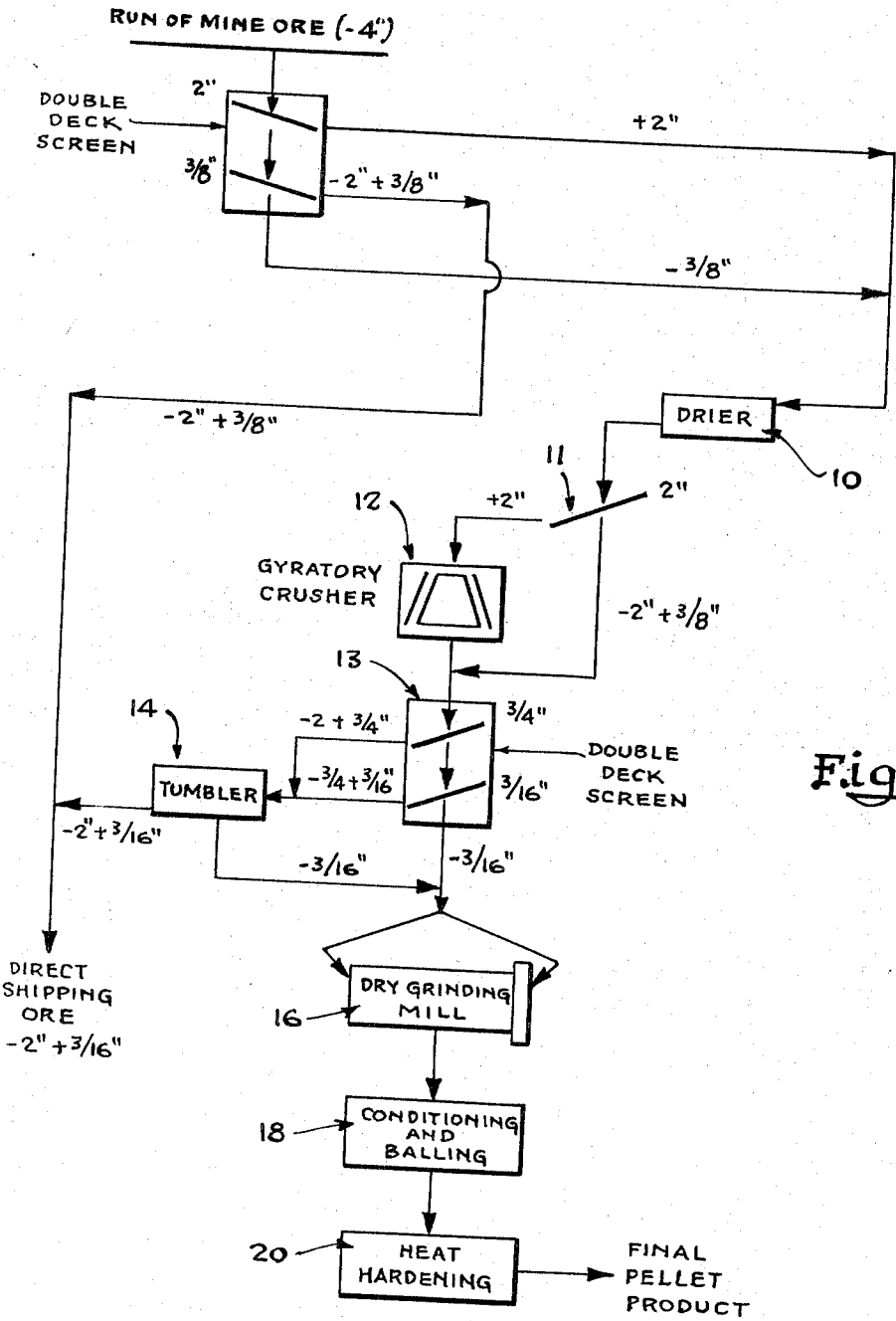
FIG. 1 is a schematic diagram of the flowsheet of the particle size preparation and pelletizing process of the present invention.

The size preparation and pelletizing process of the present invention, as schematically illustrated by the schematic block diagram flowsheet in FIG. 1 of the drawing, generally comprises initially treating the +2-inch −⅜-inch run-of-the-mine ore in a drier 10 to reduce the surface moisture concentration below about 5% by weight to permit satisfactory screening through a preliminary screen 11, and crushing the oversize in a crusher 12 to reduce the ore sufficiently to permit passage of all the ore through a two inch screen. The crushed ore is then screened through double deck screens 13 to separate the oversize (+3/16-inch material) and recover the fines (−3/16-inch material). The oversize material is preferably treated in a tumbler 14 and the minus 3/16-inch material recovered is combined with the fines which are used in the process of the present invention. The fines are stored in a surge bin and are fed as required into a dry grinding mill 16 which grinds the fines to provide the required particle size distribution. If desired, the grinding mill 16 can have a heating blower associated therewith to further dry the fines during the grinding operation. The ground fines are discharged from the grinding mill 16 and then conveyed to a conditioning and balling apparatus 18 wherein the ore is uniformly moistened and formed into green pellets. Thereafter the green pellets are fed to suitable heat hardening apparatus 20 where the pellets are subjected to controlled heating conditions which heat harden the pellets and simultaneously remove objectionable impurities therefrom.

A typical earthy ore having in excess of about 5% water of hydration, such as a Caland-type iron ore, which cannot be pelletized by conventional processes and which is used to illustrate the present invention, has the approximate and range of chemical analysis on a dry basis given in the following Table I:

TABLE I

| | Approximate | Range |
|---|---|---|
| Fe | 58.00 | 60.00–56.50 |
| SiO₂ | 6.30 | 4.00– 8.00 |
| Al₂O₃ | 1.75 | 1.00– 2.00 |
| Mn | 0.17 | 0.10– 0.60 |
| P | 0.021 | 0.015– 0.03 |
| As | 0.036 | 0.03– 0.04 |
| H₂O of hydration | 8.08 | 6.80– 9.10 |

It has been discovered that heat hardened iron ore pellets having satisfactory physical and chemical properties can be economically produced from an iron ore having in excess of 5% by weight water of hydration by (1) providing iron ore pellets with the desired porosity and strength through close control of the particle size of the ore mixture used to form the green pellets and (2) carefully controlling the time and temperature conditions used in the induration heat treatment of the green pellets.

Figure 2:
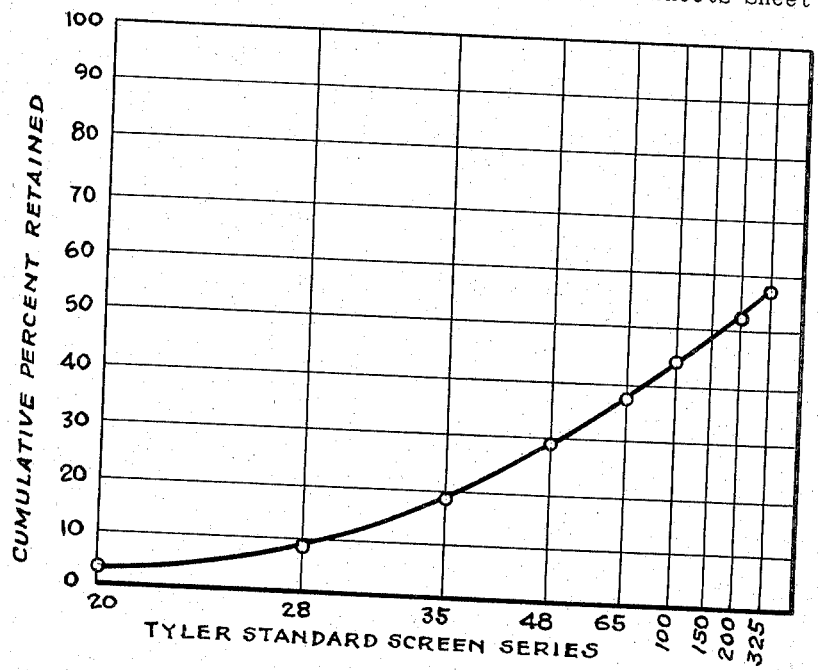
FIG. 2 is a graph showing the particle size distribution of ore fines which can be used in the process of FIG. 1.
Figure 3:
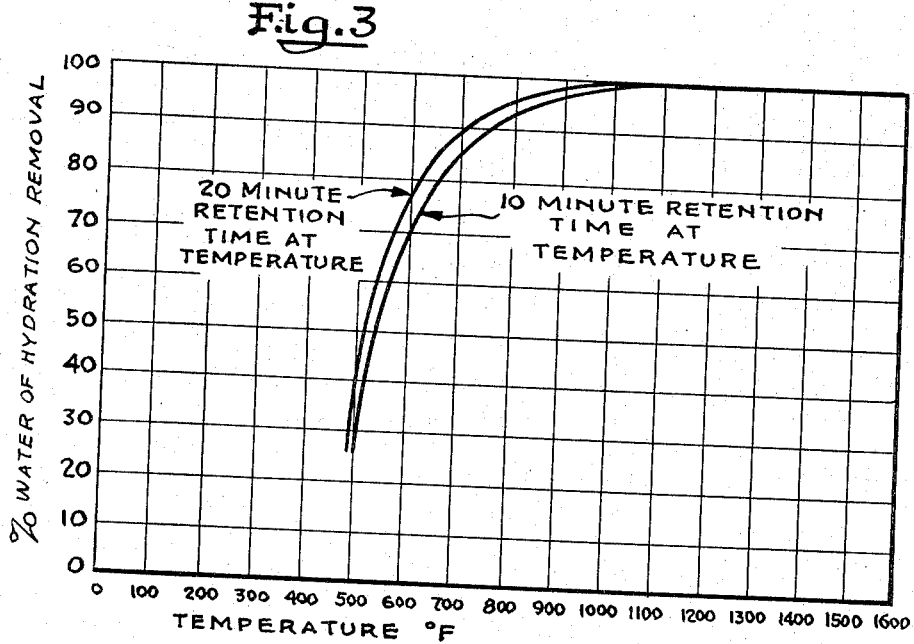
FIG. 3 is a graph showing the time-temperature relationship for the removal of water of hydration from iron ore pellets which can be used in the process of FIG. 1.

More particularly, it has been found that the rate of production of satisfactory heat-hardened pellets from an iron ore having a high percentage of water of hydration (i.e., in excess of 5% by weight) is greatly dependent on the particle size range of the ore mixture used in preparing the green pellets. For example, in a grate-kiln process an iron ore pelletizing feed mixture prepared from iron ore containing 73% by weight minus 100-mesh material can be processed to produce preheated pellets which are ready for firing at the rate of about 1.7 l.t. per day per square foot of effective grate surface area, while a pelletizing feed prepared from an iron ore containing 66% by weight minus 100-mesh material (with all other conditions remaining unchanged) yields preheated pellets for firing at a rate of 2.4 l.t. per day per square foot of effective grate surface area. Based on extensive tests, it has been found that in order to produce a satisfactory yield of heat hardened pellets the iron ore feed mixture should have between about 50% by weight minus 100 mesh (Tyler Standard Screen Size) and about 70% by weight minus 100-mesh iron ore material and preferably between about 50 and 65% by weight minus 100-mesh iron ore material and between about 35 to 50% by weight minus 325-mesh material with not more than about 10% by weight plus 10-mesh material. A particle size distribution curve of a Caland ore fines feed mixture from which satisfactory green pellets can be made in accordance with the present invention is shown in FIG. 2 of the drawing.

In preparing an ore pelletizing feed mixture of the foregoing type from an iron ore having a high percentage of water of hydration, it has been found that the minus 3/16 inch fraction of the iron ore cannot be ground by the conventional wet grinding process to produce a relatively coarse feed mixture having the required particle size distribution. It has been found possible, however, to provide a pelletizing feed mixture having the necessary particle size distribution which eliminates excessive amounts of very fine particles and avoids excessive spalling during the induration treatment of a Caland-type ore by employing the herein described dry grinding procedure (i.e., grinding in absence of added water). If the iron ore is to be dried down to about ½% moisture during the dry grinding operation, as when a thermal grinder is used, it is advisable to use in combination with a dry grinder a classifying means, such as an air classifier, which removes the fines from the grinder before overgrinding the iron ore particles.

In pelletizing a Caland-type iron ore in accordance with the present invention, iron ore fines having a high percentage of water of hydration, such as Caland ore, Steep Rock ore, or a similar earthy ore, are first separated from the larger sized fraction (i.e., plus ³⁄₁₆-inch material). The minus ³⁄₁₆-inch fraction which comprises about 42% of run-of-the-mine Caland ore, preferably after drying to provide a surface moisture content of between about 0.5% and 6.0% by weight (without however effecting significant reduction of the normal 7.9%–8.1% by weight water of hydration), is placed in a dry ore grinder, such as a center discharge grinding rod mill or a ball mill. The iron ore mixture after dry grinding is preferably comprised of approximately 55% by weight minus 100-mesh material with only about 40% by weight minus 325-mesh material and not more than about 10% by weight plus 10-mesh material. When more than about 50% by weight of the green pellet feed mixture is minus 325-mesh material, it is not commercially feasible to prepare satisfactory heat hardened pellets from an iron ore having a high percentage of water of hydration due to excessive spalling of the pellets. Also, green pellets formed of a Caland-type iron ore having substantially in excess of 65% by weight minus 100-mesh (i.e., 85%) material are also very sensitive to heat and cannot be dried by contacting with a gas having a temperature in excess of about 300° F. without causing excessive disintegration and consequent reduction in the yield of heat hardened pellets. Green pellets produced from an iron ore mixture having 62% by weight minus 100-mesh material, however, can be treated initially with drying air having a temperature of about 400° F., so that the drying time is significantly lower in comparison with that required when the pellets are formed of an iron ore mixture having 85% by weight minus 100-mesh material.

In preparing an iron ore feed mix from Caland-type ore for pelletizing, the moistened product from the dry grinding rod mill or ball mill having the herein indicated range of particle size distribution can be readily formed into balls or green pellets with or without the addition of bentonite. It is preferred, however, that a small percentage (i.e., 0.25%–0.5% by weight) of bentonite be added to the pelletizing feed mix, as the bentonite is found to be beneficial in the induration treatment by reducing spalling. The bentonite does not added to the strength of the green balls or pellets made from a Caland-type ore, since these ores normally contain a significant amount of micron-sized constituents which serve as a binder.

The surface moisture content of the ground ore is adjusted prior to or during balling to between about 9% and 14% by weight water in order to effect proper balling or pelletizing of the ore fines. When starting with ground ore having a content of only .5% by weight surface moisture, the pelletizing ore mix is preferably preconditioned prior to introducing the ore mix into the balling apparatus by adding at least 5% to 7% by weight water. For a given ore mix the percent by weight surface moisture during balling is quite critical and should be carefully controlled. Thus, it has been found advisable to control very closely the amount of water added to a particular ore mix during the green ball forming operation, with the preferred total surface moisture content of a Caland ore mixture being between about 10% to 12% by weight in order to obtain optimum results when pelletizing the Caland ore mix on a pelletizing disc apparatus. The uniformly moistened ore mixture is then fed to any conventional balling apparatus, such as a pelletizing disc apparatus.

The green pellets are carefully sized during pelletizing to maintain the green pellets within a range of preferably between about ⅝ inch and ⅜ inch in diameter, as it has been found that substantially larger sized green balls made from a Caland-type ore are very sensitive to heat and disintegrate readily during the heat induration treatment. The size of the pellets can be maintained within the specified range by screening out and shredding the oversize and undersize balls, and recycling the shredded material with the new feed material. The bulk density of the green pellets is preferably maintained between about 108 and 116 lbs./cu. ft. It has also been found that when the compression strength of the green balls exceeds about 3.5 lbs., the green pellets are excessively dense. The range of green pellet compression strength is therefore preferably maintained between about 1.5 and 3.5 lbs.

A very critical factor affecting the production of satisfactory heat hardened pellets from ore fines having a high percentage of water of hydration, such as ores having in excess of about 5% by weight water of hydration, is the manner of heat treating the green pellets formed therefrom to effect heat hardening or induration. While the type of equipment used to heat harden the green pellets is not of critical importance, the time and temperature to which the green pellets are subjected during the heat hardening treatment is of the utmost importance. In the existing commercial pelletizing heat treating procedures employing a traveling grate for the entire heat induration treatment or a combination of a traveling grate and a rotary kiln, the green pellets are conventionally subjected to three heat treating steps: (1) drying to remove surface moisture at a temperature around 500° F., (2) preheating rapidly to a temperature just below the firing temperature (i.e., 1500–200° F.), and (3) firing to heat harden the pellets (2000–2500° F.). The drying and preheating steps are generally carried out on a continuous strand, while the firing step is carried out on either a continuous strand or in a separate rotary kiln.

When the green pellets are formed of a major proportion of iron ore having in excess of about 5% by weight water of hydration, it is not feasible to heat harden the green pellets by conventional pelletizing heat treating procedures, even when the particle size of the ore pelletizing mix is carefully controlled. It has been found that green pellets formed of a Caland-type iron ore must be subjected to a special induration treatment which includes a dehydration heat treating stage between the conventional drying step and preheating step, wherein a heated gas having a temperature between about 650° F. and 1200° F. is brought into contact with the green pellets after the surface moisture has been removed but before exposing the pellets to heated gases having a temperature in the range of 1500° F. to 2000° F. normally used in a conventional preheating stage. It has been found in accordance with the present invention that when green pellets comprising a major proportion of a Caland-type ore which normally contains about 8% by weight water of hydration are to be heat hardened, the pellets must be subjected to the following heat treatment: (1) drying with gases having a temperature between of about 350–750° F. to remove surface moisture, (2) dehydration with gases having a temperature up to about 1200° F. to remove at least 50% by weight of the water of hydration, (3) preheating with gases having a temperature up to about 2000° F., (4) firing with gases having a temperature up to about 2600° F., and (5) preferably holding or "soaking" the pellets at a slightly lower temperature (1800° F.) for a few minutes, followed by cooling. A schematic diagram of the induration apparatus which can be used in the present invention is shown in FIG. 5.

Because of the pronounced tendency of the green Caland-type ore pellets to break when heated, the rate at which the temperature of the treating gases can be increased for the drying and dehydration steps of the process is unusually slow. It has been found that during the drying and dehydration steps the temperature of the treating gas should be increased in small increments of 50 to 100° F. over the indicated treating period. It has further been found, however, that the rate of drying and dehydration can be substantially increased while maintaining this slow rate of increase in the temperature of the treating gases and without increasing spalling by maintaining a relatively high air mass flow rate (lbs. of air/lbs. of pellets).

From the results of extensive heat hardening tests of the green pellets made from a Caland-type iron ore mix on a continuous strand or in a combined grate-kiln process, it has been found that heat hardened pellets can be produced at a satisfactory rate without excess breakage (spalling) of the pellets into fragments by subjecting the green pellets which have had the surface moisture thereof substantially removed to a dehydration treatment with heated air or other heated gases during which the pellets are gradually heated from about 200° F. to about 800° F. The dry pellets are initially contacted with a gas having a temperature of about 750° F. followed by gases of gradually increasing temperature up to and not exceeding about 1200° F. where a pellet bed of about 14 to 16 inches deep is used. The dehydration gas temperatures employed where a bed of pellets of about 7 inches deep is used preferably does not have a maximum temperature exceeding 1000° F. until a minimum bed temperature of at least about 700° F. is attained, at which point about 80–90% of the water of hydration is removed. Thereafter the pellets can be subjected to gases having a temperature of about 1500–2000° F. without causing excessive spalling of the green pellets.

In a further modification of the pelletizing process of the present invention, it has been found that heat hardened pellets can be made from a Caland-type ore by forming an ore mixture of the specified particle size distribution which contains about 50% to 100% by weight of the Caland ore which has been calcined with the balance of the ore being uncalcined and without subjecting the green pellets to a dehydration treatment prior to firing, as required in the previously described embodiment of the invention. A finely divided Caland-type ore can be effectively calcined prior to forming into green pellets by heating the ore to a temperature range of 800 to 1500° F. on a continuous strand or preferably in a fluidized bed reactor. When a Caland ore is calcined at 1500° F. the water of hydration remaining in the ore is about 0.6% by weight. Green pellets formed from an iron ore mixture containing at least 50% calcined ore and the balance uncalcined Caland-type ore when processed by the grate-kiln process can be dried at about 500° F. in the usual manner and then immediately contacted with heated air having a temperature up to 2000° F. without first subjecting the pellets to the previously described dehydration treatment. By using at least 50% calcined Caland ore in the green pellet mix, it is possible to increase the rate of processing green pellets on the heating strand of the grate-kiln apparatus by about 60%. Thus, a green pellet feed mixture prepared from 70% calcined Caland ore and 30% of the dried, uncalcined Caland ore has a yield rate of 3.9 long tons preheated green pellets per day per square foot of available grate area in the grate-kiln process, which is approximately 60% higher than the 2.4 l.t./ft.²/day obtained from pellets containing dried, uncalcined Caland ore produced by the same process. A very good production rate of 3.6 l.t./ft.²/day is obtained on the grate in the grate-kiln process with green pellets produced from feed containing 50% calcined Caland ore and 50% dried Caland ore. And, whereas green pellets produced from Caland ore which is only dried and not calcined yield 80–81% fired pellets, green pellets made from 100% calcined ore yield 87–88% fired pellets. However, the overall yield from the natural fines for both remain at about 84–85%.

Figure 4:
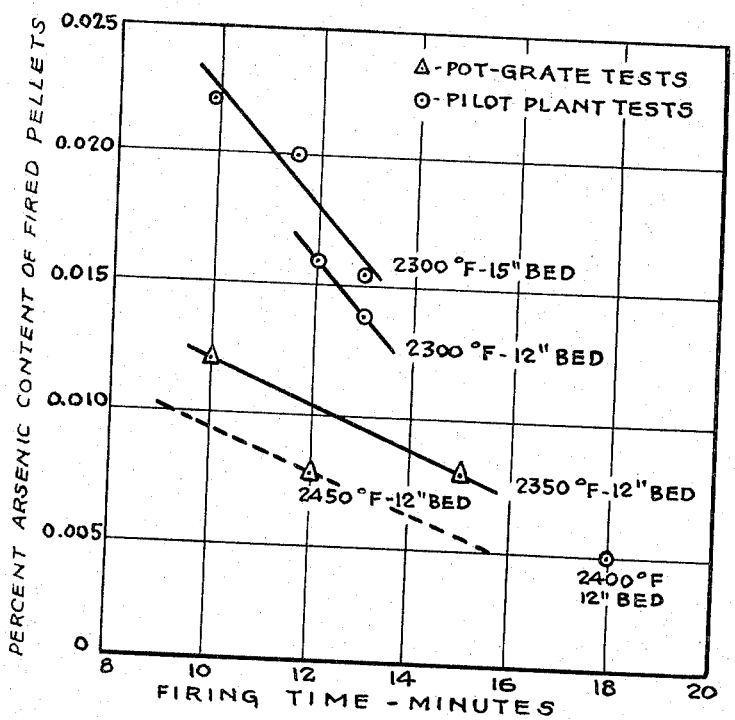
FIG. 4 is a graph showing the effect of time and temperature on the removal of arsenic from iron ore pellets produced by the process of FIG. 1.

An additional factor which has an important bearing on the heating conditions used in firing the ore pellets and which has a significant effect on the rate of production and quality of the heat hardened pellets of a Caland-type ore is the arsenic content of the ore (generally substantially above .01% by weight dry basis and between about .03–.04% by weight arsenic on a dry basis for Caland ore) and the degree of arsenic removal required for the particular metallurgical use of the said pellets. In general, it is necessary to reduce the arsenic content to below .01% by weight. The effect of time and temperature on arsenic removed during heating of Caland ore pellets is shown in FIG. 4 of the drawing. Since the arsenic-containing iron ore pellets have to be held for a substantially prolonged period in an atmosphere having a temperature in excess of about 2300° F. to effect reduction in the arsenic content below about .01% by weight (dry basis), the preheated pellets have to be fired at an elevated temperature in a kiln or on a strand at a slower rate than would normally be required for the production of heat hardened pellets having satisfactory physical properties from an iron ore having a low arsenic content. Tests have shown that only about 25% of the arsenic is removed from the pellets when the pellets are heated by a gas having a temperature below 2000° F. even for a prolonged period of 30 minutes. When Caland ore pellets in a fixed bed having a depth of about 16 inches are heated with a gas having a temperature of about 2500° F. for 15 minutes during firing, the arsenic content is reduced from .03% to .007% (dry basis). When treating a bed of Caland ore pellets having a depth of about 12 inches on a continuous strand under normal oxidizing conditions in an atmosphere having a temperature of 2350° F. for a period of about 15 minutes, the arsenic content of the bed is reduced to about .007% (dry basis). It will be evident that the bed thickness as well as temperature has a significant effect on the removal of arsenic from the pellets. In every instance, however, it is important to heat the bottom of the bed with a gas having a temperature of above about 2300° F., and preferably at least 2350° F. for at least about 5 minutes when employing the continuous strand downdraft method of firing the pellets.

Following firing on a continuous strand, the pellets are preferably held at a slightly lower temperature (i.e., 1800° F.) to further harden the pellets and remove deleterious elements, and finally the heat hardened pellets are cooled to a temperature range permitting handling by conventional belt conveyor means.

An example of the normal operating conditions of a continuous strand or grate type heat hardening cycle for about a 14- to 16-inch deep bed of green iron ore pellets sized to between 9/16 and 7/16 inch and which are formed of an uncalcined Caland ore mix having a particle size distribution as shown in FIG. 2 of the drawing is given in the following Table II:

TABLE II.—HEAT INDURATION CYCLE FOR 14" PELLET BEDS ON A CONTINUOUS STRAND

| | Time Range in Minutes | Inlet Gas Temperature, ° F. |
|---|---|---|
| Updraft Drying | 5–8 | 350 |
| Downdraft Drying | 10–14 | 350–750 |
| Dehydration | 11–16 | 750–1,200 |
| Preheat | 2–5 | 1,200–2,000 |
| Firing | 10–16 | 2,400–2,600 |
| After Firing (Soaking) | 2–4 | 1,800 |
| Cooling | 10–13 | Ambient. |

In FIG. 5 of the drawing is shown a schematic diagram of a heat induration apparatus 22 which can be used in the practice of the present invention and wherein an endless conveyor grate 31 providing a perforated gas permeable lower supporting surface movable between spaced drive wheels 32, 33 disposed at the opposite ends of the heat induration apparatus 22. The grate 31 is adapted to move between spaced side wall sections having a height of about 20 inches and extending the length of the apparatus 22 to provide lateral support for the pellet bed supported on the grate 31. Headers 24, 24a, 24b, 24c, 24d, 24e and 24f are disposed above the pellet bed and disposed immediately below the grate 31 are a plurality of wind boxes 34, 34a, 34b, 34c, 34d, 34e and 34f which are connected to suitable conduits 35, 36, 37, 38, 39, 40, and 41 respectively, to provide the required flow of heated gases through the pellet bed on the grate 31 in accordance with the heat induration cycle.

Pelletizing tests of the continuous strand process were carried out using ground iron ore fines having the particle size distribution of FIG. 2 of the drawing and to which was added between 5 and 7% water in a paddle mixer prior to balling. No bentonite was added to the mixture. A pelletizing disc was used to form the preconditioned material into balls. The green pellets were screened on ½-inch and 7/16-inch screens and only the minus ½-inch and plus 7/16-inch pellets were used to form the pellet bed. The tests were carried out on a continuous strand with a 20 inch deep pellet bed consisting of a 16 inch deep bed of green pellets and a 4-inch hearth layer of previously heat hardened pellets. The heat treating conditions of the test were as shown in the following Table III:

TABLE III

|  | Time (min.) | Temperature, °F. |
| --- | --- | --- |
| Updraft Drying | 5 | 350 |
| Downdraft Drying | 6 | 350 |
|  | 1 | 450 |
|  | 1 | 500 |
|  | 1 | 550 |
|  | 1 | 650 |
|  | 1 | 750 |
| Dehydration | 4 | 800 |
|  | 3 | 900 |
|  | 2 | 1,000 |
|  | 2 | 1,200 |
|  | 3 | 1,500 |
| Preheat | 13 | 2,400–2,550 |
| Firing | 2 | 1,800 |
| After Firing (Soaking) |  |  |
| Cooling | 12 | Ambient. |
| Total time | 57 |  |

Figure 6:
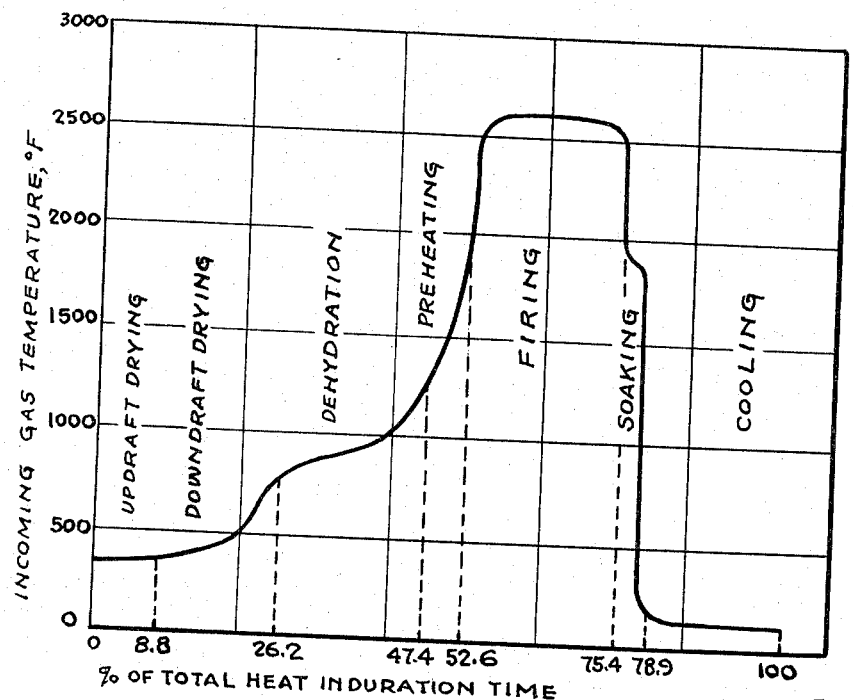
FIG. 6 is a schematic diagram of a continuous strand induration apparatus which can be used in the heat hardening step of FIG. 1.

FIG. 6 of the drawing specifically shows the heat induration cycle used for processing the pellets in accordance with the conditions shown in Table III.

The following Table IV shows the physical properties of the pellets produced under the conditions set forth in Table III:

TABLE IV.—PHYSICAL PROPERTIES OF PELLETS

A. Screen analysis—
Screen size: Weight percent
+½″ ---- 12.5
+⅜″ ---- 98.9
+¼″ ---- 99.4
+⅛″ ---- 99.7

B. Tumbler test data—
Screen size: Weight percent
28 mesh ---- 2.2

C. Compression strength: Lbs.
Top of pellet bed ---- 520
Middle of pellet bed ---- 465
Bottom of pellet bed ---- 450
Average ---- 478

D. Bulk density: Lbs./ft.³
Green pellets ---- 112
Fired pellets ---- 131

When the green pellets of Caland ore are heat treated in apparatus comprising a continuous grate-rotary kiln process, in view of the limited capacity of the rotary kiln, it is necessary to maintain the depth of the bed of green pellets on the grate at about 7 inches rather than at about 14 inches in the previous embodiment. The decrease in the thickness of the pellet bed and the use of the rotary kiln for firing the pellets causes some adjustment to be made in the heating cycle in the grate-like process as compared with the previously described continuous strand process. In general, the time and temperature conditions used in the drying and dehydration steps in the grate-kiln process are lower than those specified for the continuous strand heating process due to the thinner pellet bed being more permeable, while the firing time required in the rotary kiln is somewhat longer than that used in the continuous strand.

In the following Table V are shown the processing conditions used and the yield obtained during a batch scale pelletizing test employing the grate-kiln process:

TABLE V.—PROCESSING CONDITIONS DURING THE BATCH-SCALE PELLETIZING TESTS

|  | Dried Ore [1] | | | Calcined [2] Ore |
| --- | --- | --- | --- | --- |
| Test Series | 1 | 2 | 3 |  |
| Size Consist. of Feed Percent, −100 M | 62 | 73 | 85 | 67 |
| Drying Temp., °F | 500 | 400 | 350 | 500 |
| Drying Time (min.) | 4.5 | 6.0 | 8.0 | 7.0 |
| Dehydrating Temp., °F | 1,000 | 1,000 | 950 | None |
| Dehydrating Time (min.) | 7.0 | 7.0 | 6.0 | 4.5 |
| Preheating Temp., °F | 2,000 | 2,000 | 2,000 | 2,000 |
| Preheating Time (min.) | 4.5 | 5.0 | 5.0 | 4.5 |
| Total Time (Excludes Firing Time) (min.) | 16.0 | 18.0 | 19.0 | 11.5 |
| Production of Preheated Pellets l.t.² of Grate Area/Day | 1.97 | 1.75 | 1.61 | 2.92 |
| Firing Temp., °F | 2,400 |  |  | 2,400 |
| Firing Time (min.) | 15 |  |  | 15 |

[1] Dried Caland ore of 0.5% moisture and 7.9% water of hydration.
[2] Calcined Caland ore of 2.0% water of hydration.

In the following Table VI are shown the processing conditions used and the yields obtained during Pilot Plant scale pelletizing tests employing the grate-kiln apparatus:

TABLE VI

|  | (Run A) Three Step Process Using Partially Dried Ore Fines | (Run B) Two Step Process Using Calcined Ore Fines |
| --- | --- | --- |
| Operating Time (Hrs.) | 5 | 2 |
| Production, l.t./day/ft.² | 2.4 | 3.9 |
| Size Consist. of Feed Percent, −100 M | [1] 66 | [2] 65 |
| Speed of Grate, in./min | 3.1 | 3.25 |
| Drying Temperature: |  |  |
| Inlet Gas, °F | 490 | 580 |
| Waste Gas, °F | 260 | 230 |
| Dehydrating Temperature: |  |  |
| Inlet Gas, °F | 920 | None Req'd |
| Outlet Gas, °F | 480 | None Req'd |
| Preheating Temperature: |  |  |
| Inlet Gas, °F | 1,880 | 1,880 |
| Outlet Gas, °F | 890 | 590 |
| Firing Temperature: |  |  |
| Inlet Gas, °F | 2,350 | 2,350 |
| Outlet Gas, °F | 1,850 | 1,850 |

[1] Mix of 75% dried Caland ore of a 62% −100 Mesh plus 25% dried Caland ore of an 84% −100 Mesh.
[2] Mix of 70% Calcined Caland ore of a 66% −100 Mesh plus 30% dried Caland ore of a 62% − 100 Mesh.

The following Table VII shows the physical properties of the green pellets and the fired pellets obtained in the corresponding grate-kiln tests of Table VI:

TABLE VII.—PHYSICAL PROPERTIES OF GREEN AND FIRED PELLETS PRODUCED DURING PILOT-PLANT TESTS

| Test Run | Run A [1] | Run B [2] |
|---|---|---|
| Green Pellets Moisture (percent) | 11.8 | 13.2 |
| Bulk Density: | | |
| Green Pellets (lbs./ft.³) | 118 | 115 |
| Fired Pellets (lbs./ft.³) | 132 | 132 |
| Compression Strength: | | |
| Green Pellets (lbs.) | 3.0 | 3.1 |
| Preheated Pellets (lbs.) | 50 | |
| Fired Pellets (lbs.) | 730 | 760 |
| Tumble Index (percent −28 Mesh) | 3.5 | 2.8 |
| High Temp. Compression Strength (max. temp., °F.) | 2,050 | 2,088 |
| Screen Analyses: | | |
| Cumulative percent +½ in | 64.1 | 56.5 |
| Cumulative percent +⅜ in | 90.9 | 99.8 |

[1] Three Pass Heat-Treating System (Dried Ore Fines—Table VI).
[2] Two Pass Heat-Treating System (Mix Containing Calcined Ore Fines—Table VI).

We claim:

1. A process of producing heat-hardened ore pellets which comprises; forming an ore pelletizing mix consisting essentially of ground ore having a particle size distribution within the range of a minimum of about 50% by weight and a maximum of about 70% by weight minus 100-mesh ore particles with a maximum of about 50% by weight of the said mix being minus 325-mesh ore particles and a maximum of about 10% by weight being plus 10-mesh ore particles, adjusting the surface moisture content of said pelletizing mix to between about 9% and 14% by weight water and forming uniformly sized green ore pellets having a diameter between about ⅝ inch and about ⅜ inch, drying the said pellets to remove at least a part of the water content thereof, preheating the said pellets with a gas having a temperature between about 1500 and 2000° F. to condition said pellets for firing, and thereafter firing said pellets by contacting with a gas having a temperature in excess of about 2300° F. to heat harden said pellets.

2. A process of producing heat hardened or pellets formed from an ore having an excess of about 5% by weight water of hydration which comprises; forming an ore pelletizing mix consisting essentially of ground ore having a particle sibe distribution within the range of a minimum of about 50% by weight and a maximum of about 70% by weight minus 100-mesh ore particles with a maximum of about 50% by weight of the said mix being minus 325-mesh ore particles and a maximum of about 10% by weight being plus 10-mesh ore particles, adjusting the surface moisture content of said pelletizing mix to between about 9% and 14% by weight water and forming uniformly sized green ore pellets having a diameter between ⅝ inch and about ⅜ inch, heating said pellets to remove substantially all surface moisture therefrom and at least 50% of the water of hydration before contacting said pellets with a gas having a temperature in excess of 1500° F., preheating the said pellets with a gas having a temperature between about 1500° and 2000° F. to condition said pellets for firing, and thereafter firing said pellets by contacting with a gas having a temperature in excess of about 2300° F. to heat harden said pellets.

3. A process of producing heat hardened ore pellets formed from an iron ore having in excess of about 5% by weight water of hydration and containing volatile metal impurities which comprises; forming an iron ore pelletizing mix consisting essentially of ground iron ore having particle size distribution within the range of a minimum of about 50% by weight and a maximum of about 70% by weight minus 100-mesh ore particles with a maximum of about 50% by weight of the said mix being minus 325-mesh ore particles and a maximum of about 10% by weight being plus 10-mesh ore particles, adjusting the surface moisture content of said pelletizing mix to between about 9% and 14% by weight water and forming uniformly sized green ore pellets having a diameter between about ⅝ inch and about ⅜ inch, heating said pellets with a gas having a temperature between 350° F. and 650° F. to remove substantially all surface moisture from said ground ore and then heating with a gas having a temperature between 750° F. and 1200° F. to remove at least 50% of the water of hydration therefrom before contacting with a gas having a temperature in excess of 1500° F., preheating the said pellets with a gas having a temperature between about 1500° and 2000° F. to condition said pellets for firing, and thereafter firing said pellets by contacting said pellets with a gas having a temperature of at least about 2350° F. to heat harden said pellets and reduce the concentration of volatile metal impurities below .01% by weight.

4. A process as in claim 3, wherein said volatile metal impurity is arsenic which is present in the ore in a concentration of between about .03% and .04% by weight.

5. A process as in claim 3, wherein said iron ore is subjected to grinding in the absence of added water to provide said particle size distribution.

6. A process of producing heat hardened iron ore pellets from an iron ore having in excess of about 5% by weight water of hydration which comprises; forming an iron ore pelletizing mix comprised essentially of ground iron ore particles having about 55% by weight minus 100-mesh ore particles with about 40% by weight of said mix being minus 325-mesh ore particles and a maximum of 10% by weight plus 10-mesh ore particles, adding moisture to said pelletizing mix until the pelletizing mix comprises between about 9 and 12% by weight surface moisture and forming uniformly sized green iron ore pellets between about ⅝ inch and ⅜ inch in diameter, forming on a continuous strand a bed of said pellets and drying said green pellets by passing therethrough a heated gas having a temperature between about 350° F. and about 650° F. to remove surface moisture from said ground ore, heating said dried green pellets on said strand with a heated gas having a temperature between about 750° F. and 1200° F. to remove at least about 70% by weight of the water of hydration thereof before contacting with a preheating gas having a temperature in excess of about 1500° F., preheating the substantially dehydrated pellets on said strand with a gas having a temperature between about 1500° and 2000° F. to condition said pellets for firing, and thereafter contacting said pellets with a gas having a temperature of at least about 2350° F.

7. A process of producing heat hardened iron ore pellets formed from an iron ore having in excess of about 5% by weight water of hydration which comprises; forming an iron ore pelletizing mix comprised essentially of ground iron ore particles having about 55% by weight minus 100-mesh ore particles with about 40% by weight of said mix being minus 325-mesh ore particles and a maximum of 10% by weight plus 10-mesh ore particles, adding moisture to said pelletizing mix until the pelletizing mix comprises between about 9 and 12% by weight surface moisture and forming uniformly sized green iron ore pellets between about ⅝ inch and ⅜ inch in diameter, forming on a continuous strand a bed of said pellets and drying said green pellets by passing therethrough a heated gas having a temperature between about 350° F. and about 650° F. to remove surface moisture from said ground ore, heating said dried green pellets on said strand with a heated gas having a temperature between about 750° F. and 1200° F. to remove at least about 70% by weight of the water of hydration thereof before contacting with a preheating gas having a temperature in excess of about 1500° F., preheating the substantially dehydrated pellets on said strand with a gas having a temperature between about 1500 and 2000° F. to condition said pellets for firing, and thereafter contacting said pellets on said strand with a gas having a temperature of at least about 2350° F.

8. A process of producing heat hardened iron ore pellets from an iron ore having in excess of about 5% by weight water of hydration and having a concentration of at least .01% by weight arsenic as an impurity which comprises; forming an iron ore pelletizing mix comprised essentially of ground iron ore particles having about 55% by weight minus 100-mesh ore particles with about 40% by weight of said mix being minus 325-mesh ore particles and a maximum of 10% by weight plus 10-mesh ore particles, adding moisture to said pelletizing mix until the pelletizing mix comprises between about 9 and 12% by weight surface moisture and forming uniformly sized green iron ore pellets between about 5/8 inch and 3/8 inch in diameter, forming on a continuous strand a bed of said pellets and drying said green pellets by passing therethrough a heated gas having a temperature between about 350° F. and about 650° F. to remove surface moisture from said ground ore, heating said dried green pellets on said strand with a heated gas having a temperature between about 750° F. and 1200° F. to remove at least about 70% by weight of the water of hydration thereof before contacting with a preheating gas having a temperature in excess of about 1500° F., preheating the substantially dehydrated pellets on said strand with a gas having a temperature between about 1500° and 2000° F. to condition said pellets for firing, and thereafter charging said pellets into a rotary kiln and firing said pellets in said kiln by contacting with a gas having a temperature of at least about 2350° F. for a period of at least about 15 minutes until said pellets are heat hardened and said arsenic concentration is less than about .01% by weight of the said pellets.

9. A process of producing heat hardened iron ore pellets from an iron ore having in excess of about 5% by weight water of hydration which comprises; forming an iron ore pelletizing mix comprised essentially of ground iron ore particles having about 70% by weight minus 100-mesh ore particles with a maximum of about 50% by weight of said mix being minus 325-mesh ore particles and a maximum of about 10% by weight being plus 10-mesh ore particles, said iron ore particles prior to forming said pelletizing mix being heated to a temperature range between about 800° F. and 1500° F. to effect removal of at least 50% of said water of hydration, adjusting the surface moisture content of said pelletizing mix to between 9% and 14% by weight water and forming uniformly sized green ore pellets having a diameter between about 5/8 inch and about 3/8 inch, drying the said green ore pellets to remove at least a part of the water content thereof, preheating said pellets with a gas having a temperature between about 1500° F. and 2000° F. to condition said pellets for firing, and thereafter firing said pellets by contacting with a gas having a temperature in excess of about 2300° F. to heat harden said pellets.

10. A process as in claim 9, wherein said iron ore particles are heated prior to forming said pelletizing mix within said temperature range to effect a reduction in the water of hydration to about 2% by weight.

References Cited by the Examiner

UNITED STATES PATENTS

| | | | |
|---|---|---|---|
| 2,608,481 | 8/1952 | Royster | 75—5 |
| 3,245,778 | 4/1966 | Ban | 75—5 |

FOREIGN PATENTS 602,777  8/1960  Canada.

BENJAMIN HENKIN, *Primary Examiner.*